Dec. 19, 1933.  A. J. OTTO  1,939,916
TEMPERATURE REGULATION
Filed April 15, 1932
Fig. 1
DUAL THERMOSTAT WITH DIFFERENT TEMPERATURE SETTINGS FOR DAY AND NIGHT
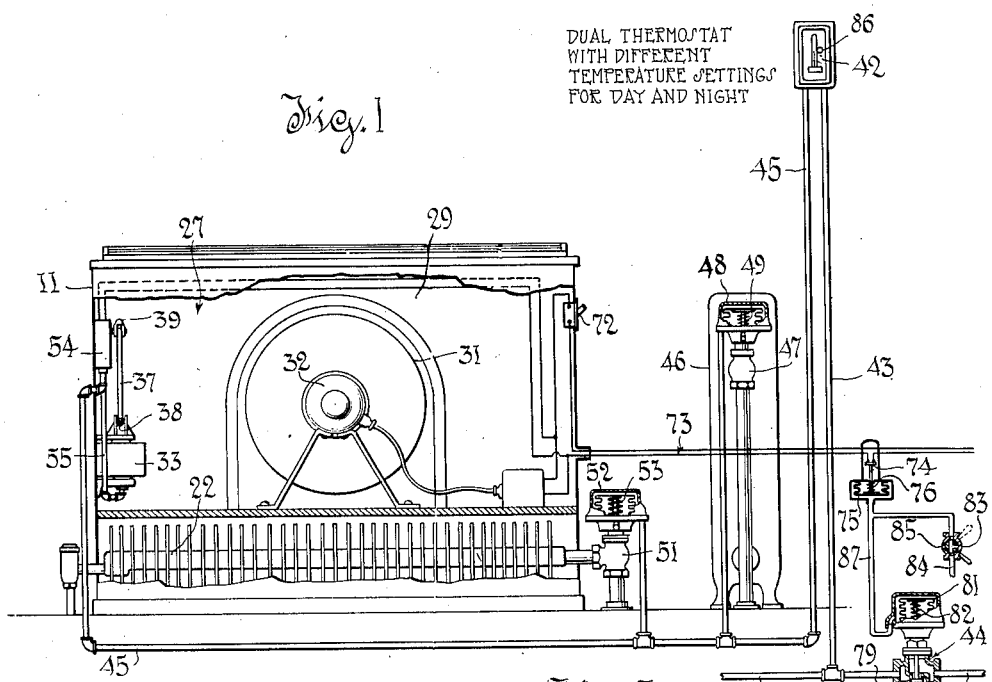
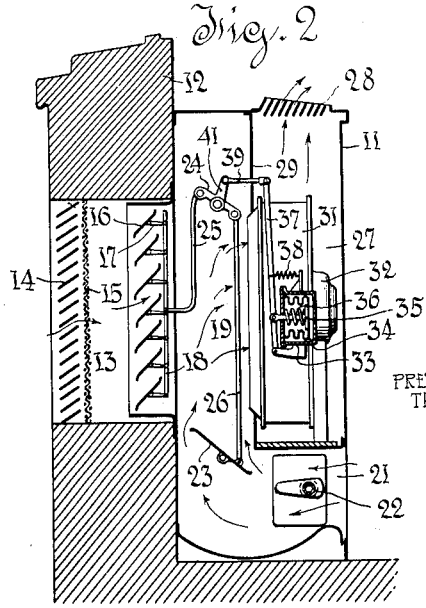
Fig. 2
Fig. 3
Fig. 4
PRESSURE LINE FROM THERMOSTAT
TO MOTOR
Fig. 5
Inventor
Arthur J. Otto
Attorneys Patented Dec. 19, 1933

1,939,916

UNITED STATES PATENT OFFICE 1,939,916

TEMPERATURE REGULATION

Arthur J. Otto, Milwaukee, Wis., assignor to Johnson Service Company, Milwaukee, Wis., a corporation of Wisconsin Application April 15, 1932. Serial No. 605,503

20 Claims. (Cl. 236—38)

This invention relates to the automatic control of heating systems and particularly to the control of systems including so-called unit heaters.

Unit heaters commonly include a recirculation duct, a fresh air duct, damper means controlling said ducts and serving to open one as the other is closed, a controllable heating unit (radiator), and a circulating fan which runs continuously except when the room is unoccupied, as it is at night.

In the control of such heaters by thermostats, it is known practice to time the response of the controls so that on rising room temperature the heating unit is shut down progressively, and after it is completely shut down, the damper is shifted to open the fresh air duct and close the recirculating duct.

If a two temperature (night and day) thermostat be used to control such an installation, a serious difficulty is encountered. When the thermostat changes from the day (normal temperature) setting to the night (low temperature) setting, the room will be at the normal temperature. This is very high as compared to the night temperature which the thermostat seeks to establish. As soon as the change of setting occurs, the thermostat opens the fresh air damper, cold air enters and reduces the temperature quickly to the low temperature setting of the thermostat. Since the whole purpose in using a two temperature thermostat is to save heat, the action just described is not only wasteful, but largely destructive of any benefit arising from the installation of two temperature thermostats.

The object of the present invention is to provide automatic means which, under night conditions, will close the fresh air damper. While this might be accomplished in various ways, and while the invention is not limited to the particular mechanism illustrated, I find it convenient to take advantage of the fact that under night conditions the circulating fan is not operating, and to provide means which will insure the closing of the fresh air damper when the circulating fan motor is shut down. With such an installation the stopping of the motor under night conditions prevents the thermostat from opening the fresh air damper when it shifts from day to night setting.

A simple and satisfactory embodiment of the invention is illustrated in the accompanying drawing, in which:—

Fig. 1 is an elevation showing a unit heater and a direct radiator connected for conjoint control, according to my invention, by a room thermostat of the so-called dual or two temperature type. In this view a portion of the casing of the unit heater is broken away.

Fig. 2 is a vertical section through the unit heater and the wall against which it is mounted.

Fig. 3 is a front elevation of an electromagnetically operated three-way valve.

Fig. 4 is a section through said valve on the line 4—4 of Fig. 3.

Fig. 5 is an enlarged horizontal section on the line 5—5 of Fig. 3.

The exact construction of the unit heater is not important, and I have chosen for illustration a commercial type to which I have successfully applied the invention.

In the drawing, 11 represents generally the casing of the unit heater. This casing is mounted against a wall 12 which is provided with an air inlet passage 13 leading from out of doors. This passage is protected by fixed louvers 14 and screen 15. Flow through the passage is controlled by a plurality of pivoted louver blades 16 which are connected to turn in unison by the arms 17 and the connecting link 18. This is a familiar type of louver damper.

Fresh air duct 13 leads to a space 19 at the back of the casing 12. Also leading to the space 19 is a recirculation passage 21 in which is mounted the heating unit here shown as a steam radiator 22.

Flow from the passage 21 to the space 19 is controlled by a pivoted damper 23. The louver blades 16 and damper 23 are operated in reverse senses by rock lever 24 which is connected to the link 18 by a rod 25 and to the damper 23 by rod 26. The parts are so arranged that the damper 23 closes when the louver blades 16 are fully open (horizontal), and is fully open when the louver blades 16 close.

The space 27 in the forward portion of the casing 11 leads to the discharge opening 28 and is separated from the space 19 by a partition 29. A fan whose housing appears at 31 is mounted in the space 27 against the partition 29, and operates to draw air from the space 19 and deliver it into the space 27 from which it flows into the room through the outlet 28.

The construction of the fan is not shown in detail, and is not material to the present invention. It will be understood, however, that the fan is driven by an electric motor 32 and is in continuous operation when the room is occupied. Under most conditions this means that it is in continuous operation through the day, and is shut down at night. The mechanism for controlling the motor will be described hereinafter.

Mounted in the space 27 is a damper motor indicated generally by the numeral 33 applied to its casing. Within this casing is a bellows diaphragm 34 which acts in thrust against the plunger 35. Plunger 35 is urged inward by a coiled compression spring 36 and is pivoted to a rock lever 37 which may be drawn to the right by a coiled tension spring 38 which assists the spring 36. The free end of lever 37 is connected by a link 39 with an arm 41 on the lever 24. The parts are so releated that when the motor is subjected to sufficient pressure, the louvers 16 are moved to open position and the damper 23 is moved to closed position.

Mounted in the room to control the heating plant is a pneumatic thermostat 42. So far as the present invention is concerned, it is immaterial what the exact construction of the thermostat is, except that it be of a type capable of being set to maintain either of two different temperatures.

In the well known Johnson Service Company dual thermostat here illustrated, air to operate the thermostat is supplied through a pipe line 43 to all the thermostats in a given installation at two characteristically different pressures, and the thermostat is provided with means responsive to the change in supply pressure to change the temperature adjustment of the thermostat.

In another type of two temperature thermostat there is a line distinct from the supply line in which the pressure is changed to set the thermostats for night or day. The difference is immaterial to the present invention.

The means for changing the controlling pressure on the line 43 includes a three-way valve 44, suited for connection to supplies at two different pressures.

The thermostat 42 operates throughout its regulative range to establish a variable pressure in the branch line 45. As room temperature rises, the pressure in the line 45 rises.

To indicate the possibility of using direct radiation in the room, in addition to the unit heater, I show an ordinary radiator 46 having a radiator valve 47 operated by a bellows motor 48 of well known form. This motor is connected to the branch line 45 and is provided with a weak spring 49 which urges the valve 47 in an opening direction. The supply of steam to the radiator 22 forming part of the unit heater is controlled by a radiator valve 51 which is operated by a bellows motor 52 connected to branch line 45. Valve 51 is urged in an opening direction by a spring 53 somewhat heavier than the spring 49, the purpose being to shut down the radiator 46 gradually and preferably completely before valve 51 starts to close.

The damper motor 33 is also connected to the branch line 45 and the cumulative effect of the springs 36 and 38 is such as to hold the louvers 16 closed until a pressure has been developed in the branch line 45 more than sufficient to insure closure of the valves 47 and 51.

According to prior practice, the branch line 45 was connected directly to the motor 33. It followed that when the thermostat shifted to night adjustment, the pressure in the branch line 45 would be raised by the thermostat 42 to a point at which it held the louver dampers 16 wide open. The present invention provides, in the embodiment illustrated, a valve which disconnects the motor 33 from the line 45 and vents the motor of motive fluid when the electric motor 32 is not running. The position of this device is indicated on Fig. 1 by the numeral 54 applied to the case of the device, and the pipe connection from the valve to the motor 33 is indicated by the numeral 55.

The construction of this valve can best be understood by reference to Figs. 3, 4 and 5. Mounted in the case 54 is a valve body 56 with which the branch line 45 and the motor connection 55 communicate. The branch line 45 leads through a passage 57 to a valve seat 58. There is also an atmospheric or exhaust seat 59 which leads to atmosphere through the clearance around the stem 61 of valve 62. The valve 62 seats alternately against the seat 58 and the seat 59 and is urged toward the seat 58 by means of a compression spring 63.

An electromagnet 64 is provided with an armature 65 which is pivoted at 66. The armature 65 is connected to actuate the valve stem 61 by means of an L-shaped link made up of two parts 67 and 68 connected by a yielding spring hinge indicated generally at 69. The purpose of the yielding hinge 69 is to insure that the valve 62 will be held against the seat 59 with a limited yielding pressure when the winding 64 is excited.

No novelty is here claimed for the mechanism enclosed in the case 54 per se, and accordingly, the general description above given is believed to be sufficient.

A chamber 71 between the valve seats 58 and 59 is in direct communication with the connection 55 to the motor 33. When the valve 62 is against seat 59, the motor is subject to the pressure in the line 45, but when the valve 62 is against seat 58, communication with the line 45 is cut off, and the motor 33 is vented to atmosphere. Under the last-named conditions, it is shifted by its spring to a position in which the louver blades 16 close, regardless of the pressure then existing in the branch line 45.

The circuits through the magnet winding 64 and the motor 32 are connected in parallel with each other, and are both controlled by a local switch 72.

The electric line 73 which furnishes current not only to the power unit illustrated, but to all similar units in a given building, is preferably controlled by a switch 74, which may conveniently be located adjacent the change-over valve 44. While the switch 74 and valve 44 can be manually operable, and within the scope of the invention may be individually operable, it is desirable in some cases to interconnect them so that they are operable in definite relation to each other.

One such interconnection is illustrated, as typical of a class. The switch 74 is operated by a single-acting bellows motor 75 which urges it to closed position against the resistance of spring 76. The valve 44 is connected to line 43 and receives pressure fluid through line 77 at 13 pounds per square inch (day pressure) and through line 78 at 17 pounds per square inch (night pressure). The valve 44 has two opposed seats respectively controlling flow from lines 77 and 78. The shifting valve head is shown at 79 and is urged in a direction to close flow from line 78 and open flow from line 77 (day setting) by a single-acting bellows motor 81. A spring 82 urges it to the opposite position (night setting) in which the higher night pressure tends also to retain it.

A three-way valve 83 having a pressure supply connection 84, leading from any suitable source, and an exhaust port 85, controls pressure in pipe 87 connected to motors 75 and 81.

In day setting of valve 83 motors 75 and 81 are under pressure, so that switch 74 is closed and valve head 79 is against its lower seat connecting low pressure supply line 77 with line 43. This sets the thermostat 42 to maintain day temperature and renders motor 32 and motor 33 operative.

In night setting of valve 83 motors 75 and 81 are vented so that switch 74 is open and valve head 79 is against its upper seat connecting high pressure line 78 with line 43. This sets the thermostat 42 for night (low) temperature, stops motor 32 and renders motor 33 inoperative so that the dampers assume recirculation position.

Most dual thermostats such as 42 have local means for setting an individual thermostat to maintain day temperature while the system as a whole is in night setting. This is typified by the push button 86 characteristic of the Johnson Service Company's system. When this is operated the temperature setting is changed but the motors 32 and 33 are not affected. Hence the fan does not operate and radiator 22 heats by recirculatory air flow.

The fundamental idea of the present invention is to insure that the fresh air damper moves to closed condition and is taken out of control of the thermostat whenever the thermostat is set to maintain a night temperature. Night and day thermostats take very diverse forms. There are, for example, electrical thermostats, as well as pneumatic thermostats, and vapor pressure thermostats. Unit heaters take a wide variety of forms, and on casual examination may appear to be radically different from that illustrated. The invention, however, is not limited to any particular type of unit heater or to any particular type of thermostat, but is directed broadly to means which will take a fresh air damper normally controlled by a thermostat out of control of that thermostat and close the damper.

The most important embodiment is when a two temperature thermostat is used and the fan and damper control are coordinated.

Various modifications within the scope of the above definition and of the appended claims fall within the broad scope of the invention.

What is claimed is,—

1. The combination of a fan; a motor connected to operate said fan; a controller for said motor; a damper serving when open to supply fresh air to said fan; means urging said damper to a closed position; a damper motor effective when energized to open said damper; a thermostat connected with said damper motor and serving to supply graduated energy thereto in response to changes in temperature; and means responsive to said controller and effective in the position in which the fan motor is stopped, to disconnect the damper motor from said thermostat and deenergize the damper motor.

2. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; and valve means controlling the connection between said thermostat and damper motor and responsive to motion of said switch, said valve means serving to disconnect said motor from said thermostat and vent the pressure fluid from the motor when said switch is in position to stop said electric motor.

3. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; a valve interposed in the connection between said thermostat and said damper motor and shiftable between two positions, in one of which the damper motor and thermostat are connected, and in the other of which they are disconnected and the damper motor is vented to atmosphere; electrically actuated means serving when energized to shift said valve to the first named position; and connections for subjecting said electrically actuated means to control by said switch.

4. The combination of a fan; an electric motor connected to drive said fan; a damper associated with said fan; yielding means urging said damper toward closed position; a pressure fluid acutated motor serving to urge said damper in an opening direction; a thermostat connected with said motor and functioning to admit pressure fluid to and exhaust it from the same in response to changes in temperature; a valve interposed in the connection between the thermostat and motor and having two positions, in the first of which it connects the thermostat with the damper motor, and in the second of which it disconnects the damper motor from the thermostat, and vents pressure fluid from the damper motor; yielding means urging the valve to the second position; electrically actuated means for urging the valve to the first position; and a switch controlling said electric motor and said electrically actuated means and serving in one position to supply energy to both and in another position to interrupt the flow of energy to both.

5. The combination of a fan; a motor for operating said fan; a damper associated with said fan; a damper motor for operating said damper; a heating unit; a thermostat for controlling said damper and heating unit; a controller for starting and stopping said fan motor; means effective upon the stopping of said fan motor for taking said damper motor out of control by said thermostat; means for setting said thermostat to maintain either of two temperatures; and means ensuring conjoint operation of said setting means and said controller.

6. The combination of a fan; a motor for operating said fan; a damper associated with said fan; a damper motor for operating said damper; a heating unit; a thermostat for controlling said damper and heating unit; a controller for starting and stopping said fan motor; means effective upon the stopping of said fan motor for taking said damper motor out of control by said thermostat; means for setting said thermostat to maintain either of two temperatures; and a single actuator for said controller and said setting means.

7. The combination of a fan; a motor for operating said fan; a heating unit; a thermostat for controlling said heating unit; a controller for starting and stopping said fan motor; means for setting said thermostat to maintain either of two temperatures; and means ensuring conjoint operation of said setting means and said controller.

8. The combination of a fan; a motor for operating said fan; a damper serving when open to supply fresh air to said fan; means urging said damper closed; a damper motor effective when energized to open said damper; a thermostat connected with said damper motor and serving to supply graduated energy thereto in response to changes in temperature; a controller for said fan motor; means responsive to the setting of said controller and effective in the motor stopping position thereof to disconnect the damper motor from the thermostat and de-energize the damper motor; means for setting said thermostat to maintain either of two temperatures; and means for operating said setting means and controller in definite relation with each other.

9. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; valve means controlling the connection between said thermostat and damper motor and responsive to motion of said switch, said valve means serving to disconnect said motor from said thermostat and vent the pressure fluid from the motor when said switch is in position to stop said electric motor; means for setting said thermostat to maintain either of two temperatures; and means effective to open said switch in the low temperature setting of said thermostat.

10. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; a valve interposed in the connection between said thermostat and said damper motor and shiftable between two positions, in one of which the damper motor and thermostat are connected, and in the other of which they are disconnected and the damper motor is vented to atmosphere; electrically actuated means serving when energized to shift said valve to the first named position; connections for subjecting said electrically actuated means to control by said switch; means for setting said thermostat to maintain either of two temperatures; and means effective to open said switch in the low temperature setting of said thermostat.

11. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; valve means controlling the connection between said thermostat and damper motor and responsive to motion of said switch, said valve means serving to disconnect said motor from said thermostat and vent the pressure fluid from the motor when said switch is in position to stop said electric motor; means operable from a remote point to set said thermostat to maintain either of two temperatures; and means effective in one such setting of the thermostat to open said switch.

12. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; a valve interposed in the connection between said thermostat and said damper motor and shiftable between two positions, in one of which the damper motor and thermostat are connected, and in the other of which they are disconnected and the damper motor is vented to atmosphere; electrically actuated means serving when energized to shift said valve to the first named position; connections for subjecting said electrically actuated means to control by said switch; means operable from a remote point to set said thermostat to maintain either of two temperatures; and means effective in one such setting of the thermostat to open said switch.

13. The combination of a fan; an electric motor connected to operate said fan; a switch controlling said motor; a damper associated with said fan; a pressure fluid actuated damper motor connected to said damper to move the same in an opening direction; yielding means urging said damper in a closing direction; a thermostat connected with said damper motor and capable of admitting and exhausting pressure fluid to and from the same; valve means controlling the connection between said thermostat and damper motor and responsive to motion of said switch, said valve means serving to disconnect said motor from said thermostat and vent the pressure fluid from the motor when said switch is in position to stop said electric motor; pressure actuated means for setting said thermostat to maintain either of two temperatures; pressure actuated means for opening and closing said switch; and a single controller for both said pressure actuated means.

14. The combination of a fan; a motor for operating said fan; a normally closed damper associated with said fan; a damper motor for opening said damper; a heating unit; a thermostat connected to control said heating unit; intercepting means operable to subject and free said damper to and from control by said thermostat; a controller for said fan motor; means for setting said thermostat to maintain either of two temperatures; and a master controller operatively related to said thermostat setting means, said fan motor controller and said intercepting means, and serving to operate the same substantially in unison.

15. The combination of a motor driven fan; a damper serving when open to supply fresh air to said fan; a damper motor for actuating said damper; a thermostat of the progressive type arranged to control said damper motor; a controller for starting and stopping said fan; and means responsive to said controller, and effective in the fan stopping position thereof, to disconnect the damper motor from said thermostat and cause said damper to close.

16. The combination of a motor driven fan; a damper associated with said fan; a damper motor arranged to actuate said damper; a heating unit associated with said fan; a thermostat of the progressively acting type connected to control said damper motor and said heating unit; controlling means for starting and stopping said fan; and means, effective when the fan is stopped, to disconnect the damper motor from said thermostat and cause the damper to close.

17. The combination of a motor driven fan; a mixing damper associated with said fan, and arranged to vary in inverse senses, the flow of fresh and recirculated air; a damper motor arranged to actuate said mixing damper progressively; a heating unit associated with said fan; a thermostat of the progressively acting type arranged to control said damper motor and said heating unit; a controller for starting and stopping said fan; and means, effective when said fan is stopped, to disconnect the damper motor from said thermostat and cause the mixing damper to move to a position to obstruct the flow of fresh air.

18. The combination of a motor driven fan; a normally closed damper associated therewith; a damper motor for opening said damper; a heating unit associated with said fan; a thermostat connected to control said heating unit and also said damper motor; intercepting means interposed between said thermostat and said damper motor and having two positions, in one of which it permits control of the damper motor by the thermostat, and in the other of which it disconnects said damper motor from the thermostat, causing the damper to close; and controlling means for conjointly controlling the fan motor and said intercepting means.

19. The combination of a motor driven fan; a mixing damper controlling in inverse senses the flow of fresh and recirculated air to said fan, said damper being biased to move toward a position in which the fresh air opening is closed; a motor for actuating said damper; a heating unit associated with said fan, a thermostat connected to control said heating unit and the motor of said mixing damper; intercepting means interposed between said damper motor and said thermostat and having two conditions, in one of which the damper motor is subject to control by, and in the other of which it is free of control by said thermostat; and means for starting and stopping said fan and for operating said intercepting means conjointly.

20. The combination of a heating unit for a room; a damper controlling the supply of fresh air to such room; a thermostat connected to control said heating unit and said damper, said thermostat including means for setting it to maintain either of two characteristic temperatures; and means associated with said setting means and effective when said thermostat is set to maintain the lower of said two temperatures, for maintaining said damper closed throughout the operative range of the thermostat.

ARTHUR J. OTTO.